US012579845B2

(12) United States Patent
Qiao et al.

(10) Patent No.: US 12,579,845 B2
(45) Date of Patent: Mar. 17, 2026

(54) CORRELATION-BASED OBJECT ANTI-SPOOFING FOR DUAL-PIXEL CAMERAS

(71) Applicant: Google LLC, Mountain View, CA (US)

(72) Inventors: Siyuan Qiao, Mountain View, CA (US); Wen-Sheng Chu, San Jose, CA (US)

(73) Assignee: Google LLC, Mountain View, CA (US)

( * ) Notice: Subject to any disclaimer, the term of this patent is extended or adjusted under 35 U.S.C. 154(b) by 124 days.

(21) Appl. No.: 18/549,547

(22) PCT Filed: Apr. 1, 2022

(86) PCT No.: PCT/US2022/071500
§ 371 (c)(1),
(2) Date: Sep. 7, 2023

(87) PCT Pub. No.: WO2023/191888
PCT Pub. Date: Oct. 5, 2023

(65) Prior Publication Data
US 2025/0029424 A1    Jan. 23, 2025

(51) Int. Cl.
*G06V 40/40*        (2022.01)
*G06F 21/32*        (2013.01)
*G06V 10/74*        (2022.01)

(52) U.S. Cl.
CPC .............. *G06V 40/45* (2022.01); *G06F 21/32* (2013.01); *G06V 10/761* (2022.01)

(58) Field of Classification Search
CPC .... G06V 40/45; G06V 10/761; G06V 40/172; G06V 40/40; G06F 21/32
See application file for complete search history.

(56) References Cited

U.S. PATENT DOCUMENTS

| | | | |
|---|---|---|---|
| 10,223,802 B2 * | 3/2019 | Lange | G06F 18/22 |
| 2020/0160533 A1 * | 5/2020 | Du | G06T 7/593 |

(Continued)

FOREIGN PATENT DOCUMENTS

| | | | |
|---|---|---|---|
| CN | 113888405 A | * | 1/2022 |

OTHER PUBLICATIONS

Acharyya, A., Hudson, D., Chen, K.W., Feng, T., Kan, C.Y. and Nguyen, T., Sep. 2016, Depth estimation from focus and disparity. In 2016 IEEE International Conference on Image Processing (ICIP) (pp. 3444-3448). IEEE. (Year: 2016).*

(Continued)

*Primary Examiner* — Philip J Chea
*Assistant Examiner* — Dorianne Alvarado David
(74) *Attorney, Agent, or Firm* — McDonnell Boehnen Hulbert & Berghoff LLP

(57)        ABSTRACT

A method includes obtaining dual-pixel image data that represents an object and includes a first sub-image and a second sub-image, and generating (i) a first feature map based on the first sub-image and (ii) a second feature map based on the second sub-image. The method also includes generating a correlation volume by determining, for each respective offset of a plurality of offsets between the first feature map and the second feature map, pixel-wise similarities between (i) the first feature map and (ii) the second feature map offset from the first feature map by the respective offset. The method further includes determining, by an anti-spoofing model and based on the correlation volume, a spoofing value indicative of a likelihood that the object represented by the dual-pixel image data is being spoofed.

20 Claims, 9 Drawing Sheets

(56) References Cited

U.S. PATENT DOCUMENTS

| | | | | |
|---|---|---|---|---|
| 2020/0210690 A1* | 7/2020 | Han | G06T 7/73 |
| 2020/0226777 A1* | 7/2020 | Luo | G06T 7/593 |
| 2020/0242788 A1* | 7/2020 | Jacobs | H04N 23/631 |
| 2020/0364478 A1* | 11/2020 | Zhang | G06N 3/047 |
| 2020/0412966 A1* | 12/2020 | Kikuchi | G02B 7/34 |
| 2021/0027081 A1* | 1/2021 | Zhang | G06T 7/55 |
| 2021/0042950 A1* | 2/2021 | Wantland | G06T 19/006 |
| 2021/0067705 A1* | 3/2021 | Galor Gluskin | G06T 7/80 |
| 2021/0082136 A1* | 3/2021 | Nikitidis | G06V 40/172 |
| 2021/0209387 A1* | 7/2021 | Nikitidis | G06V 10/764 |
| 2021/0357691 A1* | 11/2021 | Luo | G06V 10/143 |
| 2022/0027649 A1* | 1/2022 | Lee | G06V 40/168 |
| 2022/0078352 A1* | 3/2022 | Kikuchi | H04N 23/88 |
| 2022/0086309 A1* | 3/2022 | Kim | H04N 23/81 |
| 2022/0101539 A1* | 3/2022 | Lin | G01P 13/00 |
| 2022/0148137 A1* | 5/2022 | Punnappurath | H04N 13/271 |
| 2022/0284233 A1* | 9/2022 | Degol | G06N 3/084 |
| 2022/0319238 A1* | 10/2022 | Kim | G06V 40/1318 |
| 2022/0343525 A1* | 10/2022 | Garg | G06T 5/70 |
| 2022/0375042 A1* | 11/2022 | Garg | G06T 7/50 |
| 2022/0398747 A1* | 12/2022 | Lin | G06T 7/246 |
| 2023/0056657 A1* | 2/2023 | Aboulaim | G06T 9/004 |
| 2023/0084980 A1* | 3/2023 | Lyu | G06V 40/168 382/100 |
| 2023/0206700 A1* | 6/2023 | Khan | G06V 40/165 382/116 |
| 2023/0306718 A1* | 9/2023 | Revaud | G06T 3/40 |
| 2024/0013573 A1* | 1/2024 | Liu | G06V 40/171 |
| 2024/0412563 A1* | 12/2024 | Laliberte | G06V 40/40 |

OTHER PUBLICATIONS

Exxact. 2018. Atrous Convolutions & U-Net Architectures for Deep Learning: A Brief History. https://www.exxactcorp.com/blog/Deep-Learning/atrous-convolutions-u-net-architectures-for-deep-learning-a-brief-history (Year: 2018).*
Ji, Y., Zhang, H., Zhang, Z. and Liu, M., 2021. CNN-based encoder-decoder networks for salient object detection: A comprehensive review and recent advances. Information Sciences, 546, pp. 835-857. (Year: 2021).*
Park, K., & Kim, D.-H. (2019). Accelerating Image Classification using Feature Map Similarity in Convolutional Neural Networks. Applied Sciences, 9(1), 108. https://doi.org/10.3390/app9010108 (Year: 2018).*
Punnappurath, A., Abuolaim, A., Afifi, M. and Brown, M.S., Apr. 2020, Modeling defocus-disparity in dual-pixel sensors. In 2020 IEEE International Conference on Computational Photography (ICCP) (pp. 1-12). IEEE. (Year: 2020).*
Seifi, M., Sabater, N., Drazic, V. and Perez, P., Oct. 2014, Disparity-guided demosaicking of light field images. In 2014 IEEE International Conference on Image Processing (ICIP) (pp. 5482-5486). IEEE. (Year: 2014).*

Bangunharcana, A., Cho, J. W., Lee, S., Kweon, I. S., Kim, K. S., & Kim, S. (Sep. 2021). Correlate-and-excite: Real-time stereo matching via guided cost volume excitation. In 2021 IEEE/RSJ International Conference on Intelligent Robots and Systems (IROS) (pp. 3542-3548). IEEE. (Year: 2021).*
Cai, R., Hariharan, B., Snavely, N., & Averbuch-Elor, H. (2021). Extreme rotation estimation using dense correlation volumes. In Proceedings of the IEEE/CVF Conference on Computer Vision and Pattern Recognition (pp. 14566-14575). (Year: 2021).*
Gu, X., Fan, Z., Zhu, S., Dai, Z., Tan, F., & Tan, P. (2020). Cascade cost volume for high-resolution multi-view stereo and stereo matching. In Proceedings of the IEEE/CVF conference on computer vision and pattern recognition (pp. 2495-2504). (Year: 2020).*
Jeon, S., & Heo, Y. S. (2022). Efficient multi-scale stereo-matching network using adaptive cost volume filtering. Sensors, 22(15), 5500. (Year: 2022).*
Jung, S. H., & Heo, Y. S. (Oct. 2021). Disparity probability volume guided defocus deblurring using dual pixel data. In 2021 International Conference on Information and Communication Technology Convergence (ICTC) (pp. 305-308). IEEE. (Year: 2021).*
Li, Z., Yuan, J., Jia, B., He, Y., & Xie, L. (2021). An effective face anti-spoofing method via stereo matching. IEEE Signal Processing Letters, 28, 847-851. (Year: 2021).*
Xin, S., Wadhwa, N., Xue, T., Barron, J. T., Srinivasan, P. P., Chen, J., . . . & Garg, R. (2021). Defocus map estimation and deblurring from a single dual-pixel image. In Proceedings of the IEEE/CVF International Conference on Computer Vision (pp. 2228-2238). (Year: 2021).*
Yang, X., Feng, Z., Zhao, Y., Zhang, G., & He, L. (2022). Edge supervision and multi-scale cost volume for stereo matching. Image and Vision Computing, 117, 104336. (Year: 2022).*
Garg et al., "Learning Single Camera Depth Estimation using Dual-Pixels," arXiv:1904.05822v3, Aug. 14, 2019, 19 pages.
International Searching Authority, International Search Report and Written Opinion mailed on Nov. 30, 2022, issued in connection with International Patent Application No. PCT/US2022/071500, filed on Apr. 1, 2022, 14 pages.
Jia et al., "Multi-Scale Cost Volumes Cascade Network for Stereo Matching," arXiv:2102.01940v2, Mar. 13, 2021, 7 pages.
Teed et al., "RAFT: Recurrent All-Pairs Field Transforms for Optical Flow," arXiv:2003.12039v3, Aug. 25, 2020, 21 pages.
Wu et al, "Single-Shot Face Anti-Spoofing for Duel Pixel Camera," IEE Transactions on Information Forensics and Security, 2021, pp. 1440-1451, vol. 16.
Zhang et al., "GA-Net: Guided Aggregation Net for End-to-end Stereo Matching," 2019 IEEE/CVF Conference on Computer Vision and Pattern Recognition (CVPR), 2019, pp. 185-194.
Li, Zhishan et al., "An Effective Face Anti-Spoofing Method via Stereo Matching," IEEE Signal Processing Letters, 2021, pp. 847-851, vol. 28.
Wadhwa, Neal et al., "Synthetic Depth-of-Field with a Single-Camera Mobile Phone," ACM Trans. Graph., 2018, 13 pages, vol. 37, No. 5.

* cited by examiner

FRONT VIEW          RIGHT SIDE VIEW          BACK VIEW

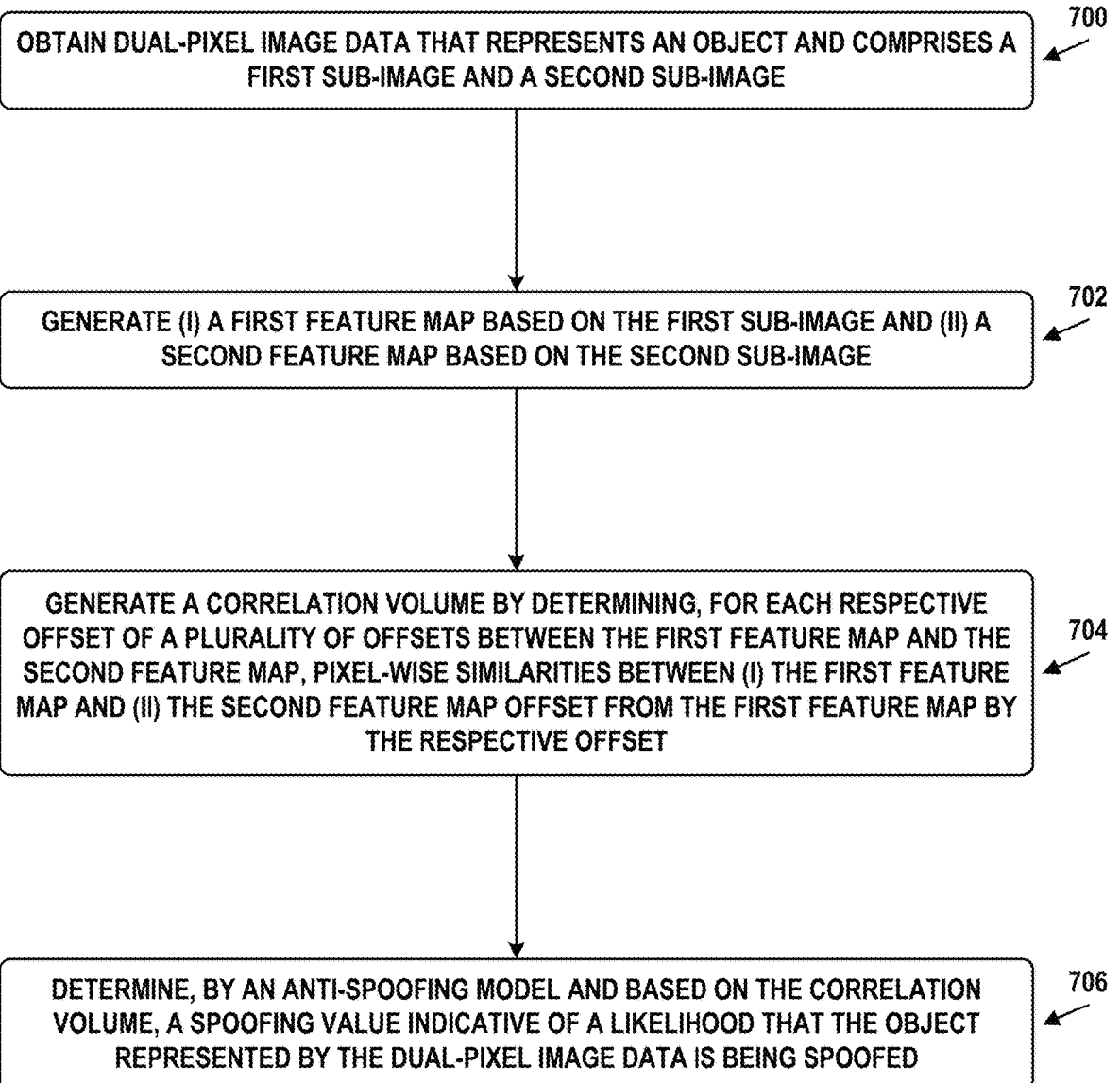

OBTAIN DUAL-PIXEL IMAGE DATA THAT REPRESENTS AN OBJECT AND COMPRISES A FIRST SUB-IMAGE AND A SECOND SUB-IMAGE

700

GENERATE (I) A FIRST FEATURE MAP BASED ON THE FIRST SUB-IMAGE AND (II) A SECOND FEATURE MAP BASED ON THE SECOND SUB-IMAGE

702

GENERATE A CORRELATION VOLUME BY DETERMINING, FOR EACH RESPECTIVE OFFSET OF A PLURALITY OF OFFSETS BETWEEN THE FIRST FEATURE MAP AND THE SECOND FEATURE MAP, PIXEL-WISE SIMILARITIES BETWEEN (I) THE FIRST FEATURE MAP AND (II) THE SECOND FEATURE MAP OFFSET FROM THE FIRST FEATURE MAP BY THE RESPECTIVE OFFSET

704

DETERMINE, BY AN ANTI-SPOOFING MODEL AND BASED ON THE CORRELATION VOLUME, A SPOOFING VALUE INDICATIVE OF A LIKELIHOOD THAT THE OBJECT REPRESENTED BY THE DUAL-PIXEL IMAGE DATA IS BEING SPOOFED

CORRELATION-BASED OBJECT ANTI-SPOOFING FOR DUAL-PIXEL CAMERAS

CROSS-REFERENCE TO RELATED APPLICATIONS

The present application is a National Stage Application under 35 U.S.C. § 371 and claims priority to International Patent Application No. PCT/US2022/071500, filed Apr. 1, 2022, and titled "Correlation-Based Object Anti-Spoofing for Dual-Pixel Cameras," which is incorporated herein by reference in its entirety.

BACKGROUND

A computing device may be configured to allow a particular user to unlock the computing device and/or enable at least some functionality thereof based on an image of the particular user's face. Specifically, when the computing device determines that the image represents the particular user's face, the computing device may be unlocked and/or at least some functionality thereof may be enabled. When the computing device determines that the image does not represent the particular user's face (e.g., represents another user's face), the computing device may remain locked and/or at least some functionality thereof may remain disabled. In some cases, users may attempt to spoof the particular user's face by presenting, to a camera of the computing device, representations (e.g., physical images) of the particular user's face, rather than the physical face itself, in order to gain unauthorized access to the computing device. Accordingly, it is desirable to develop anti-spoofing techniques that prevent and/or reduce the odds of successful spoofing attempts.

SUMMARY

Dual-pixel image data may include a first-sub image generated by, for example, left photosites of a dual-pixel image sensor and a second sub-image generated by, for example, right photosites of the dual-pixel image sensor. The dual-pixel image data may include depth information that may be used to distinguish between genuine authentication attempts using a physical object (e.g., face of a user) and attempts to spoof the physical object using representations and/or imitations thereof. Specifically, the first and second sub-images may be used to generate, respectively, a first feature map and a second feature map. A correlation volume may be generated by determining pixel-wise similarities between the first feature map and the second feature map for a plurality of shifts/offsets therebetween. The plurality of shifts/offsets may be based on a maximum defocus-disparity of a camera that generated the dual-pixel image data. An anti-spoofing model may process the correlation volume and generate a spoofing value indicative of a likelihood that the dual-pixel image data represents an attempt at spoofing the object.

In a first example embodiment, a method includes obtaining dual-pixel image data that represents an object and includes a first sub-image and a second sub-image. The method also includes generating (i) a first feature map based on the first sub-image and (ii) a second feature map based on the second sub-image. The method additionally includes generating a correlation volume by determining, for each respective offset of a plurality of offsets between the first feature map and the second feature map, pixel-wise similarities between (i) the first feature map and (ii) the second feature map offset from the first feature map by the respective offset. The method further includes determining, by an anti-spoofing model and based on the correlation volume, a spoofing value indicative of a likelihood that the object represented by the dual-pixel image data is being spoofed.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 is a flow chart, in accordance with examples described herein.

DETAILED DESCRIPTION

Figure 1:
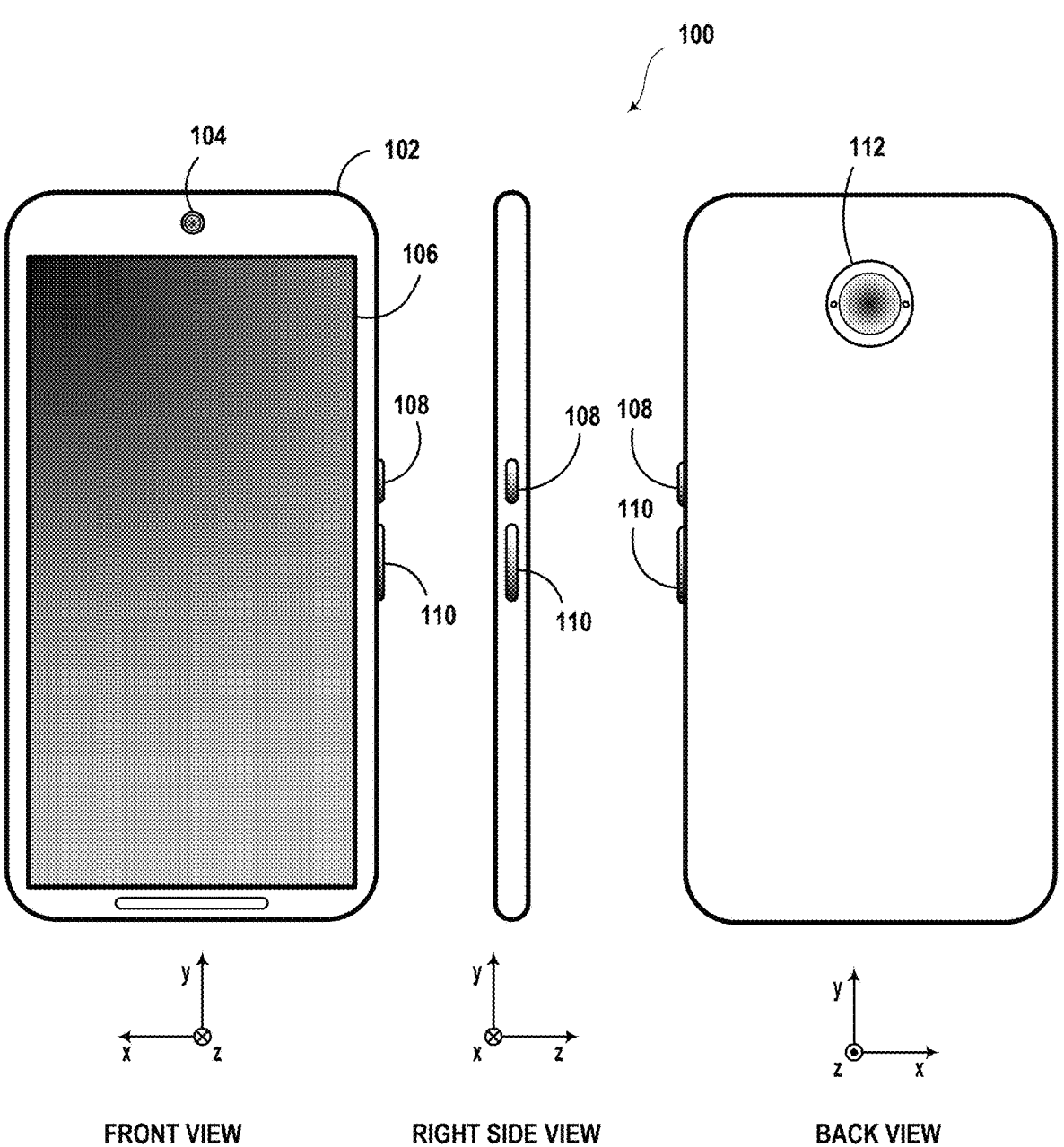
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

An image of a particular user's face may be used to authenticate the particular user in connection with, for example, accessing aspects of a computing device or system. Specifically, authentication of the particular user may involve determining whether (i) the image represents the three-dimensional (3D) face of the particular user or (ii) the image represents an attempt at spoofing the particular user using, for example, a two-dimensional (2D) representation of the particular user's face. Stated another way, authentication may involve determining whether the particular user is physically present during the authentication attempt, or another user is attempting to fake the particular user's presence.

In some implementations, image-based user authentication may involve using dual-pixel image data generated by a dual-pixel camera. The dual-pixel image data may include two sub-images, each generated by a corresponding subset of photosites of a dual-pixel image sensor of the dual-pixel camera. When a scene portion is in-focus of the dual-pixel camera, the scene feature may appear the same in both the first sub-image and the second sub-image. When the scene portion is out-of-focus of the dual-pixel camera, the scene feature may appear differently in the first sub-image and the second sub-image. Specifically, the scene portion may be offset/shifted in the first sub-image relative to the second sub-image and/or blurred across multiple pixels of the first and second sub-images.

The depth-based cues present in dual-pixel image data may be used to identify face spoofing attempts. In some cases, the dual-pixel image data may be used to determine a depth image, which may be used to distinguish real faces from spoofs. For example, a machine learning depth model may be used to generate the depth image based on respective feature maps of the first sub-image and the second sub-image, and a machine learning anti-spoofing model may determine, based on the depth image, whether the dual-pixel image data represents a real 3D face or a spoof thereof. However, the machine learning depth model may, in some cases, generate depth values that imply presence of a 3D face where, for example, only a 2D representation or other imitation thereof is present. That is, the machine learning depth model may be prone to generating incorrect depth values based on visual features (e.g., textures, facial patterns, etc.) present in the first and second sub-images. Thus, spoof detection relying on determination of depth images may, at least in some cases, be inaccurate, resulting in spoofing attempts being treated as genuine authentication attempts.

Accordingly, an anti-spoofing system may instead generate a correlation volume that preserves at least some of the depth-based cues present in the dual-pixel image data without generating incorrect depth values. In this approach, an encoder-decoder model may be configured to generate a first feature map based on the first sub-image and a second feature map based on the second sub-image. Rather than using these feature maps to generate a depth image, the feature maps may instead be compared to determine local pixel-wise similarities between the first and second sub-images.

Specifically, features of each respective pixel of a plurality of pixels of the first feature map may be compared to respective features of a corresponding plurality of pixels of the second feature map, and respective similarity values may be generated based on each compared pixel pair. The corresponding plurality of pixels of the second feature map may be selected based on a maximum defocus-disparity of the dual-pixel camera. For example, the corresponding plurality of pixels may include all pixels, or a subset thereof, across which a scene feature represented by the respective pixel in the first feature map could be blurred and/or offset/shifted to in the second feature map. For example, when the maximum defocus-disparity of the dual-pixel camera is N pixels, up to N similarity values may be determined for each respective pixel of the plurality of pixels of the first feature map. These similarity values may thus contain depth information, but do not represent the depth explicitly, which beneficially reduces the chances of generating incorrect depth values.

The correlation volume may be processed by an anti-spoofing model, which may be configured to generate a spoofing value based on the correlation volume. The spoofing value may indicate a likelihood that the dual-pixel image data represents an attempt to spoof the face using a representation and/or imitation of the real 3D face. The spoofing value may be compared to a threshold value to determine whether the dual-pixel image data represents the real face or a spoof thereof. These techniques may alternatively or additionally be applied in the context of objects other than faces, to determine whether the object itself, or a spoof thereof, is represented by particular dual-pixel image data.

The correlation-based anti-spoofing system may be trained end-to-end, with training supervision being provided by a training dual-pixel image data and a corresponding ground-truth label indicating whether the training dual-pixel image data is real or a spoof. Unlike in the depth-based approach, training of the correlation-based anti-spoofing model might not depend on access to accurate depth images (which may be difficult to generate) corresponding to the training dual-pixel image data. Thus, the encoder-decoder model and the anti-spoofing model may be trained jointly based on training dual-pixel image data and the corresponding ground-truth labels.

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112, one or more of which may be configured to generate dual-pixel image data.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
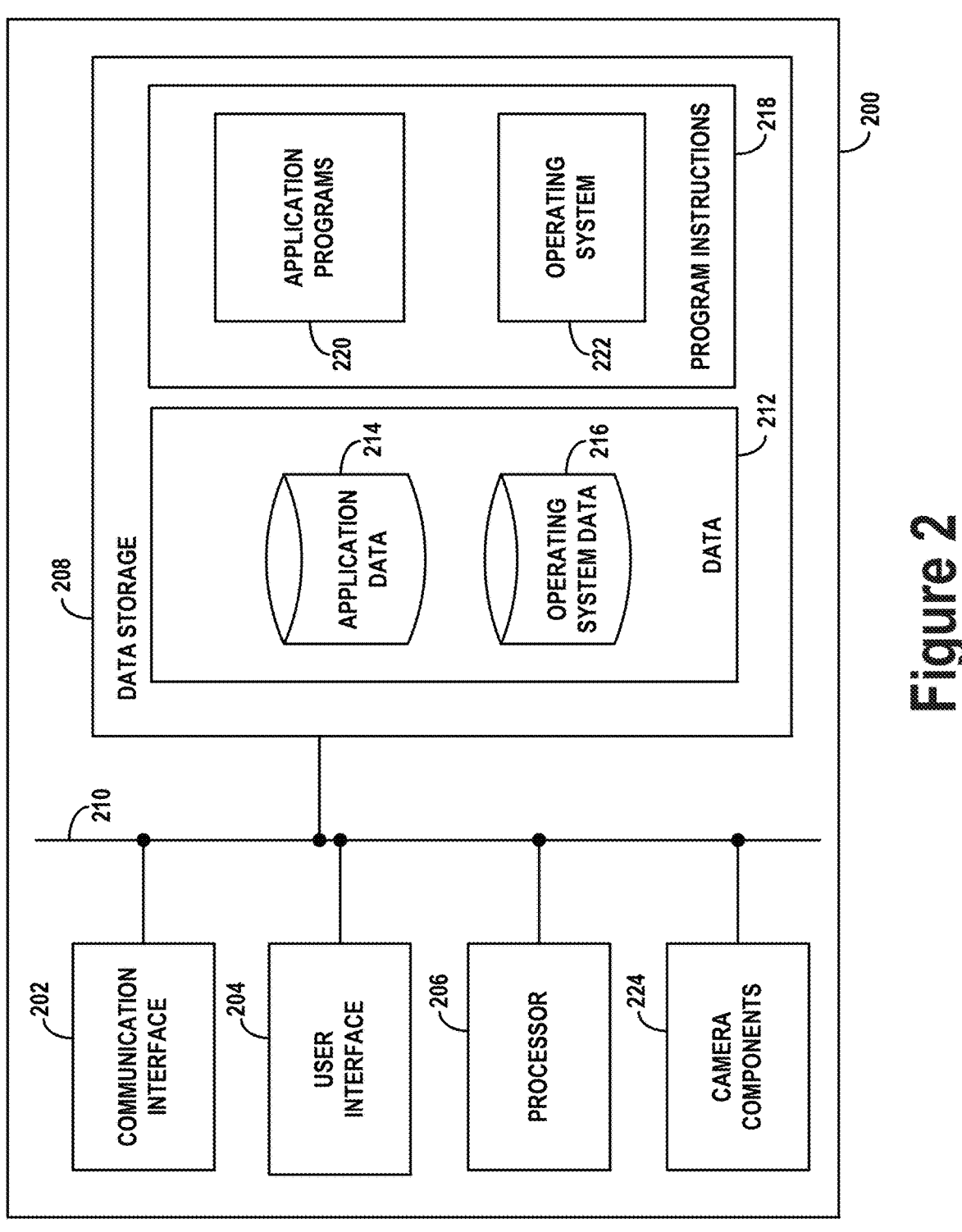
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infra-red light spectrum (e.g., electromagnetic radiation having a wavelength of 701 nanometers-1 millimeter). Camera components 224 may be controlled at least in part by software executed by processor 206.

III. EXAMPLE DUAL-PIXEL IMAGE SENSOR

Figure 3:
FIG. 3 illustrates a dual-pixel image sensor, in accordance with examples described herein.

FIG. 3 illustrates an example dual-pixel image sensor 300 that is configured to generate dual-pixel image data. Specifically, dual-pixel image sensor 300 includes a plurality of pixels arranged in a grid that includes columns 302, 304, 306, and 308 through 310 (i.e., columns 302-310) and rows 312, 314, 316, and 318 through 320 (i.e., rows 312-320). Each pixel is shown divided into a first (e.g., left) photosite, indicated with a corresponding hatched region, and a second (e.g., right) photosite, indicated with a corresponding white-filled region. Thus, the right half of the pixel located at column 302, row 312 is labeled "R" to indicate the right photosite, and the left half of the pixel is labeled "L" to indicate the left photosite.

Although the photosites of each pixel are shown dividing each pixel into two equal vertical halves, the photosites may alternatively divide each pixel in other ways. For example, each pixel may be divided into a top photosite and a bottom photosite. The areas of the photosites might not be equal. Further, dual-pixel image sensor 300 may alternatively be implemented with the pixels thereof divided into a different number of photosites. For example, dual-pixel image sensor 300 may be implemented as a quad-pixel image sensor with each respective pixel thereof divided into four photosites that define four quadrants of the respective pixel (e.g., a (first) top left quadrant, a (second) top right quadrant, a (third) bottom left quadrant, and a (fourth) bottom right quadrant). Thus, dual-pixel image sensor 300 may alternatively be referred to as a split-pixel image sensor, since pixels thereof are split into multiple photosites.

Each photosite of a given pixel may include a corresponding light sensor (e.g., a photodiode), the output signal of which may be read independently of other light sensors. Additionally, each pixel of dual-pixel image sensor 300 may be associated with a corresponding color filter (e.g., red, green, or blue). A demosaicing algorithm may be applied to the output of dual-pixel image sensor 300 to generate a color image. In some cases, fewer than all of the pixels of dual-pixel image sensor 300 may be divided into multiple photosites. For example, each pixel associated with a green color filter may be divided into two independent photosites, while each pixel associated with a red or blue color filter may include a single photosite. In some cases, dual-pixel image sensor 300 may be used to implement front-facing camera 104 and/or rear-facing camera 112, and may form part of camera components 224.

Dual-pixel image sensor 300 may be configured to generate dual-pixel image data, which may include a first sub-image generated by a first set of photosites (e.g., left photosites only) and a second sub-image generated by a second set of photosites (e.g., right photosites only). In other cases, the split-pixel image data may be quad-pixel image data that includes a first sub-image generated by a first set of photosites (e.g., top left photosites only), a second sub-image generated by a second set of photosites (e.g., top right photosites only), a third sub-image generated by a third set of photosites (e.g., bottom left photosites only), and a fourth sub-image generated by a fourth set of photosites (e.g., bottom right photosites only).

The sub-images may be generated as part of a single exposure. For example, the sub-images may be captured substantially simultaneously, with a capture time of one sub-image being within a threshold time of a capture time of another sub-image. The signals generated by each photosite of a given pixel may be combined into a single output signal, thereby generating conventional (e.g., RGB) image data.

When a scene feature, such as a foreground object, a background object, an environment, and/or portion(s) thereof, being imaged is in-focus (i.e., the scene feature is within a depth of field of the camera, and/or light reflected therefrom is focused within a depth of focus of the camera), the respective signal generated by each photosite of a given pixel may be substantially the same (e.g., the signals of a split-pixel may be within a threshold of one another). When the scene feature being imaged is out-of-focus (i.e., the scene feature is in front of or behind the depth of field of the camera, and/or the light reflected therefrom is focused in front of or behind the depth of focus of the camera), the respective signal generated by a first photosite of a given pixel may differ from the respective signal(s) generated by the other photosite(s) of the given pixel. The extent of this difference may be proportional to an extent of defocus, and may indicate the position of the scene feature relative to the depth of field (and the position at which light reflected therefrom is focused relative to the depth of focus). Accordingly, split-pixel image data may be used to determine whether a scene feature being photographed is within, in front of, and/or behind a depth of field of the camera device.

IV. EXAMPLE ANTI-SPOOFING SYSTEM

Figure 4:
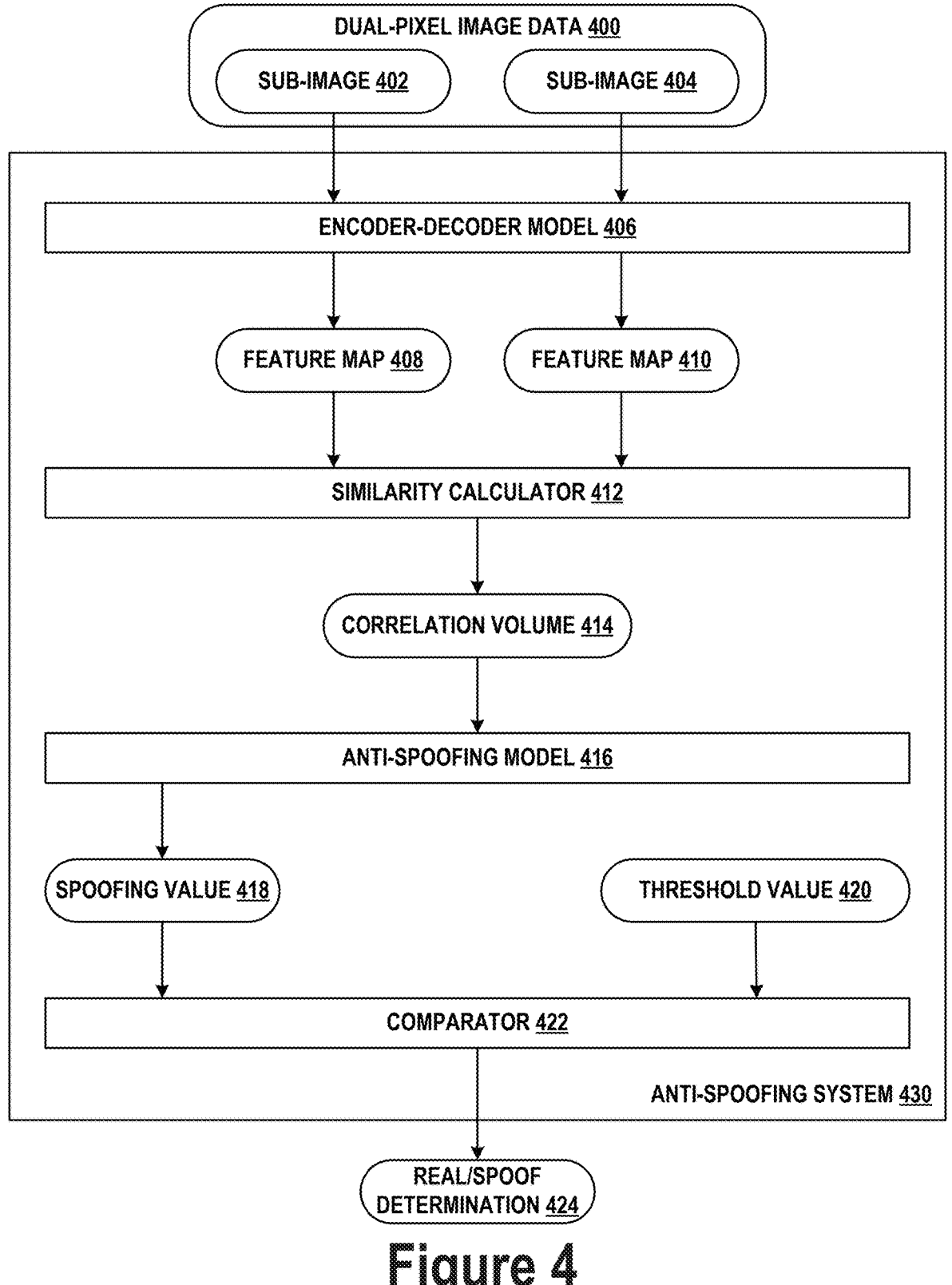
FIG. 4 illustrates an anti-spoofing system, in accordance with examples described herein.

FIG. 4 illustrates anti-spoofing system 430, which may be used by a computing device to distinguish between (i) real 3D objects (e.g., human faces, eyes, fingerprints, and/or other body parts/locations used for biometric-based authentication) and (ii) attempts to spoof such 3D objects using, for example, 2D representations thereof and/or other imitations thereof. Spoofing the 3D object may involve attempting to use the 2D representation(s) (or other imitations) thereof to fake and/or falsely pose as the 3D object, possibly with the intent of causing a computing device to incorrectly recognize the 2D representation(s) (or other imitations) as the real 3D object and perform a desired task (e.g., unlock the device) in response to a successful spoofing attempt. For example, spoofing may be attempted in connection with a biometric-based authentication process for the computing device. The determination made by anti-spoofing system 430 may be separate from and/or additional to the biometric-based authentication process itself, which may be configured to determine whether measured biometric data (which may or might not be spoofed) matches expected biometric data.

Anti-spoofing system 430 may include encoder-decoder model 406, similarity calculator 412, anti-spoofing model 416, and comparator 422. The components of anti-spoofing system 430 may be implemented as hardware, software, or a combination thereof. Anti-spoofing system 430 may be configured to generate real/spoof determination 424 for an object based on dual-pixel image data 400 representing the object. Real/spoof determination 424 may indicate whether the object, as represented by dual-pixel image data 400, is the 3D object itself (i.e., the real/actual 3D object) or an imitation thereof (e.g., a 2D image thereof) attempting to spoof the 3D object. For example, the object may be a human face, which might be spoofed using an image of the human face (i.e., dual-pixel image 400 may be an image of an image of the face).

Dual-pixel image data 400 may include at least sub-image 402 and sub-image 404. Dual-pixel image data 400 may be captured by dual-pixel image sensor 300. Each of sub-images 402 and 404 may have the same resolution as dual-pixel image data 400, and may be captured as part of a single exposure by a corresponding subset of photosites. Accordingly, each respective pixel of dual-pixel image data 400 may be associated with a corresponding pixel in each of sub-images 402 and 404, and a value of the respective pixel may be based on, for example, a sum of values of the corresponding pixels in sub-images 402 and 404. In some implementations, dual-pixel image data 400 may include additional sub-images. For example, dual-pixel image data 400 may include four sub-images and may thus be referred to as quad-pixel image data.

Encoder-decoder model 406 may be configured to generate (i) feature map 408 based on sub-image 402 and (ii) feature map 410 based on sub-image 404. Thus, feature map 408 may represent visual features of sub-image 402, and feature map 410 may represent visual features of sub-image 404. Since both feature maps 408 and 410 are generated using encoder-decoder model 406, these feature maps may allow for a comparison of the visual features of sub-images 402 and 404 to determine similarities therebetween. In cases where dual-pixel image data 400 includes more than two sub-images, encoder-decoder model 406 may be configured to generate a corresponding feature map for each of the sub-images (e.g., four feature maps in the case of quad-pixel image data).

In some implementations, feature maps 408 and 410 may have a same resolution as sub-images 402 and 404. In other implementations, a resolution of feature maps 408 and 410 may represent a fraction (e.g., 3/2, 3/4, 1/2, etc.) of the resolution of sub-images 402 and 404, and/or the resolution of feature maps 408 and 410 may differ from the resolution of sub-images 402 and 404 by a constant number of pixels. Additional details of feature maps 408 and 410 are illustrated in and discussed with respect to FIG. 5A.

Encoder-decoder model 406 may include an encoder model configured to generate a latent vector representation based on a sub-image, and a decoder model configured to generate a feature map for the sub-image based on the latent vector representation thereof. In some implementations, encoder-decoder model 406 may include skip-connections between one or more layers of the encoder model and corresponding (e.g., in terms of size/resolution) layers of the decoder model. For example, encoder-decoder model 406 may utilize a U-Net or similar architecture. Thus, encoder-decoder model 406 may be configured to generate, using the encoder model, a first latent vector representation of sub-image 402 and a second latent vector representation of sub-image 404 and, using the decoder model, feature map 408 based on the first latent vector representation and feature map 410 based on the second latent vector representation. The encoder model and/or the decoder model may include various possible neural network architectures configured to process image data.

Using encoder-decoder model 406 to generate feature maps 408 and 410 may allow for increased control over the resolution of feature maps 408 and 410. Specifically, while the encoder model may down-sample the respective representations of sub-images 402 and 404, the decoder model may allow these representations to be up-sampled, thus allowing the features thereof to be compared at, for example, the full resolution of sub-images 402 and 404 and/or resolutions higher than the full resolution. Operating at or above full resolution of sub-images 402 and 404 may allow anti-spoofing system 430 to model disparity at pixel and/or sub-pixel levels, which allows for modeling small disparities that may be present in dual-pixel image data 400, thereby improving the performance of anti-spoofing system 430. Nevertheless, in some implementations, encoder-decoder model 406 may instead be replaced with an encoder model that generates feature maps 408 and 410 directly, without relying on subsequent processing by a corresponding decoder model.

Similarity calculator 412 may be configured to generate correlation volume 414 based on feature map 408 and feature map 410. Specifically, differences in depth across the area of dual-pixel image data 400 may cause disparities between pixels of sub-image 402 and sub-image 404. Specifically, when a particular scene portion represented by dual-pixel image data 400 is in-focus (e.g., located at the focal plane or within a threshold distance thereof), corresponding pixels (i.e., pixels having the same pixel coordinates) of sub-images 402 and 404 may have substantially the same values. When the particular scene portion is out-of-focus (e.g., located beyond the threshold distance relative to the focal plane, including in front of or behind the focal plane), the particular feature may be represented by a first pixel of sub-image 402 and a second pixel of sub-image 404, where the second pixel is offset/shifted relative to the first pixel, and where the magnitude of this shift depends on a depth of the particular scene portion. A maximum possible offset/shift may be a property of the camera, and may be based on a maximum defocus-disparity thereof. Additionally, when the particular scene portion is out-of-focus, the particular scene feature may be blurred across multiple pixels of first sub-image 402 and multiple pixels of sub-image 404.

Accordingly, for each respective pixel of feature map 408, similarity calculator 412 may be configured to compare the features of the respective pixel to respective features of a corresponding plurality of pixels of feature map 410, thereby determining a plurality of pixel-wise similarity values. The corresponding plurality of pixels of feature map 410 may be spatially co-located with the respective pixel of feature map 408, and may include (i) a corresponding pixel having the same coordinates as the respective pixel of feature map 408 and (ii) one or more pixels that are adjacent to the corresponding pixel and offset/shifted therefrom by up to the maximum defocus-disparity between sub-images 402 and 404. The direction of the offset/shift of the one or more adjacent pixels may be based on a direction along which pixels are split into multiple photosites. Thus, similarity calculator 412 may compare the features of different pixel pairs that could represent the same portion of the environment, and thereby quantify a likelihood that each pixel pair represents the same portion of the environment. The similarities associated with the different pixel pairs may thus provide information about the depth of the portion of the environment.

Correlation volume may have a width that is equal to a width of feature map 408 (and feature map 410, which may have the same width as feature map 408), a height that is equal to a height of feature map 408 (and feature map 410, which may have the same height as feature map 408), and a depth equal to a number of pixel pairs compared by similarity calculator 412. A similarity between first features of a first pixel of feature map 408 and second features of a second pixel of feature map 410 may be based on an inner product between the first and second features, and/or a cosine similarity between the first and second features, among other possible similarity metrics between two vectors. Additional details of correlation volume 414 are illustrated in and discussed with respect to FIGS. 5B and 5C.

Anti-spoofing model 416 may be configured to generate spoofing value 418 based on correlation volume 414. Spoofing value 418 may represent a likelihood that dual-pixel image data 400 represents an attempt at spoofing a 3D object using a representation and/or imitation thereof, rather than representing the 3D object itself. For example, spoofing value 418 may be selected from a predefined range (e.g., 0 to 1), with a minimum value of the predefined range indicating that dual-pixel image data 400 is not a spoofing attempt, a maximum value of the predefined range indicating that dual-pixel image data 400 is a spoofing attempt, and intermediate values along the predefined range indicating intermediate likelihoods of dual-pixel image data 400 representing a spoofing attempt.

In some implementations, anti-spoofing model 416 may include a correlation encoder model and a binary classifier model. The correlation encoder model may be configured to generate a latent representation of correlation volume 414, and the binary classifier model may be configured to generate spoofing value 418 based on the latent representation of correlation volume 414. Thus, the correlation encoder may include at least one input for each element of correlation volume 414, and may reduce a dimensionality of correlation volume 414 during encoding thereof. In one example, the correlation encoder model of anti-spoofing model 416 and the encoder model of encoder-decoder model 406 may have a same or similar architecture, but might include different parameters that configure each model to perform its corresponding (different) task. The binary classifier model may include a multi-layer perceptron, among other possibilities.

Comparator 422 may be configured to compare spoofing value 418 to threshold value 420, and generate real/spoof determination 424 based on results of the comparison. For example, when spoofing value 418 exceeds threshold value 420, comparator 422 may be configured to generate real/spoof determination 424 indicating that dual-pixel image data 400 represents an attempt at spoofing the 3D object. When spoofing value 418 does not exceed (i.e., is equal to or less than) threshold value 420, comparator 422 may be configured to generate real/spoof determination 424 indicating that dual-pixel image data 400 represents the 3D object itself. Thus, for example, real/spoof determination 424 may indicate whether a particular user is physically present for a biometric-based (e.g., facial-recognition-based, iris-recognition-based) authentication process, or the particular user's presence is being spoofed by another user. In general, real/spoof determination 424 may indicate whether a measured 3D shape of the object, as represented by dual-pixel image data 400, matches an expected 3D shape of the object, as represented by training samples used to train anti-spoofing model 430.

A computing device may determine how to operate based on real/spoof determination 424. For example, the computing device may be unlocked and/or certain operations thereof may be enabled when real/spoof determination 424 indicates that dual-pixel image data 400 represents the 3D object itself (e.g., when the particular user's actual face is being used for authentication). The computing device may be locked, maintained in a locked state, and/or certain operations thereof may be disabled when real/spoof determination 424 indicates that dual-pixel image data 400 represents an attempt at spoofing the 3D object (e.g., when the particular user's face is being spoofed for authentication).

V. EXAMPLE FEATURE MAPS AND CORRELATION VOLUME

Figure 5A:
FIGS. 5A and 5B illustrate feature maps, in accordance with examples described herein.
Figure 5A:
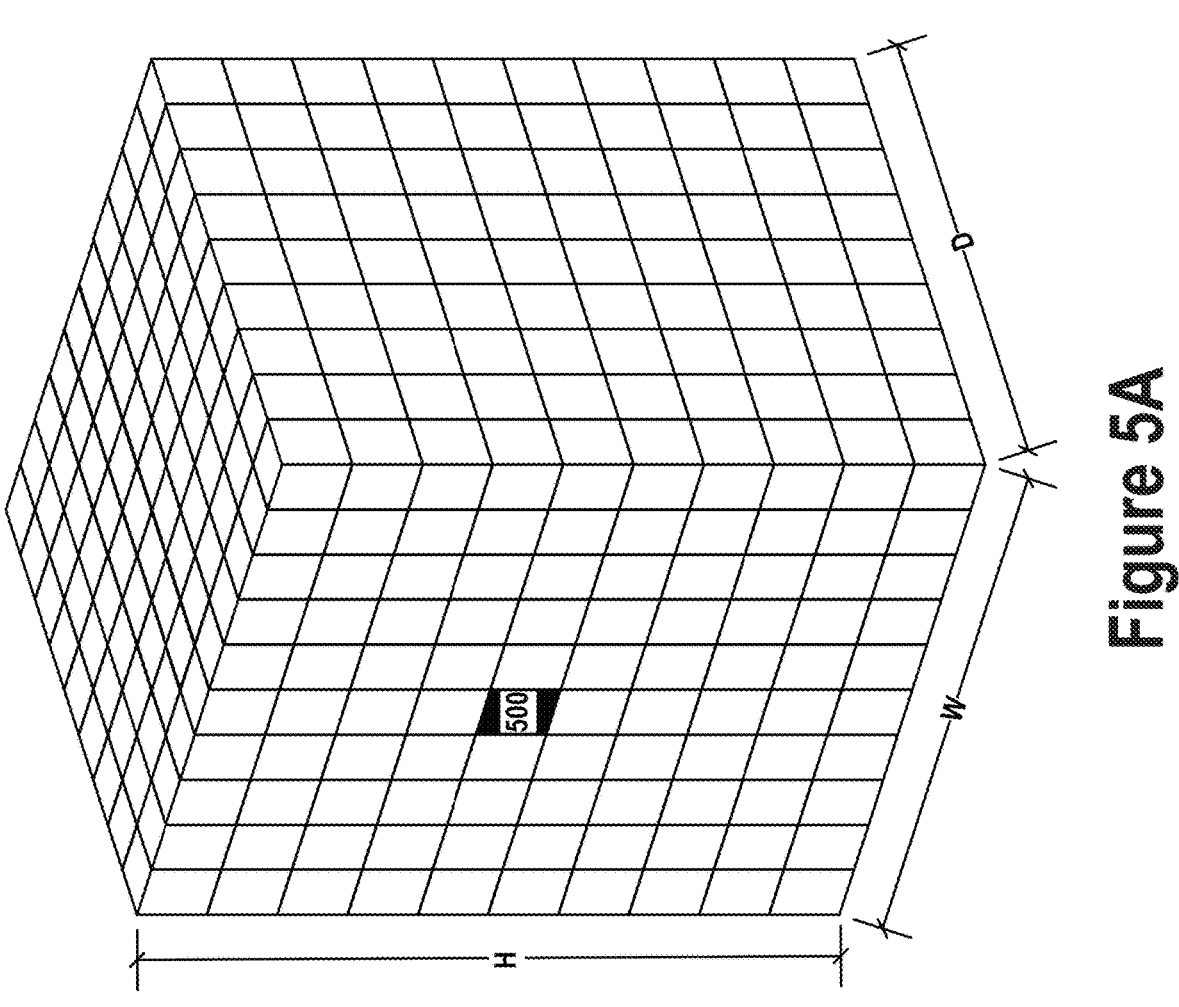
Figure 5B:
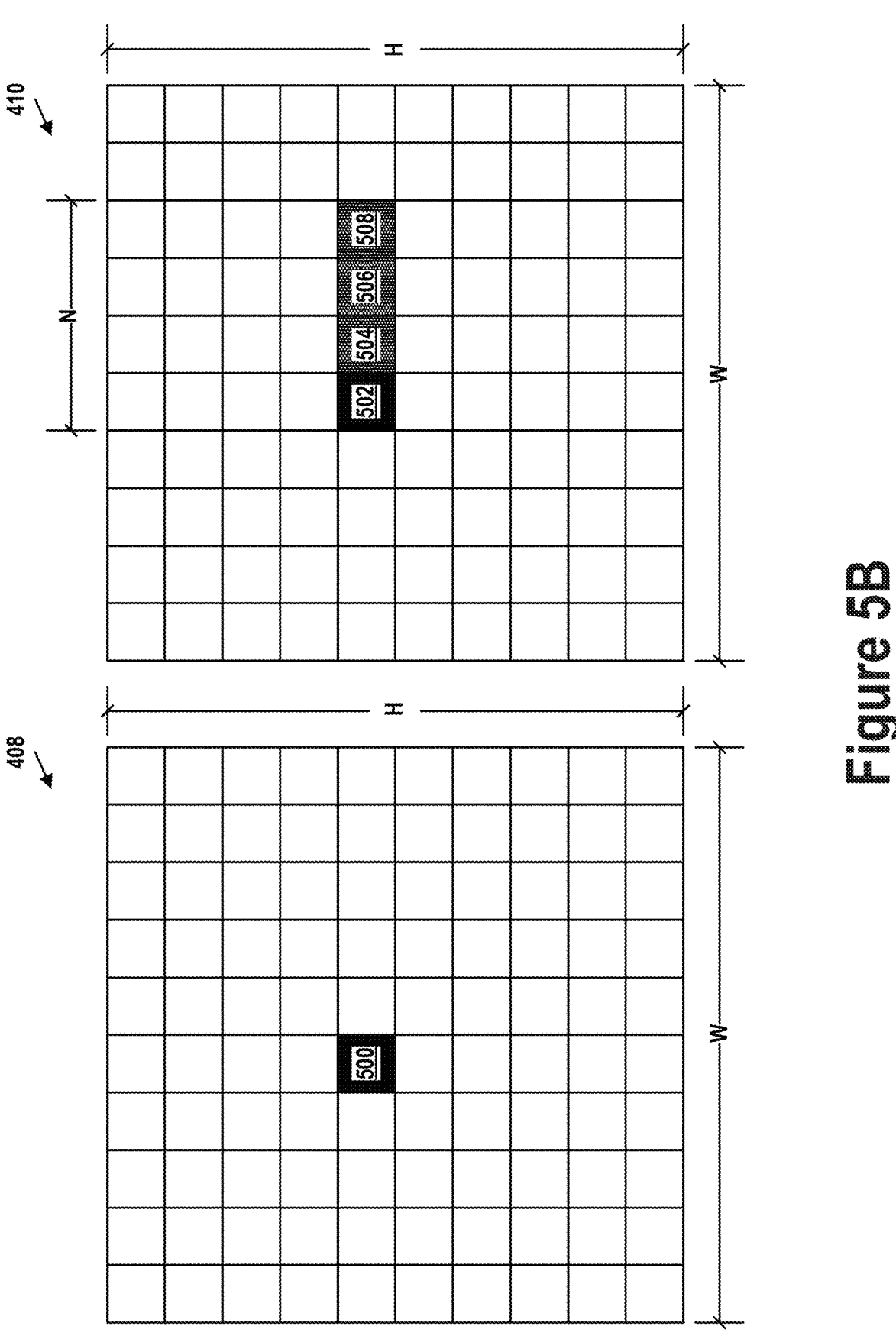
Figure 5C:
FIG. 5C illustrates a correlation volume, in accordance with examples described herein.
Figure 5C:
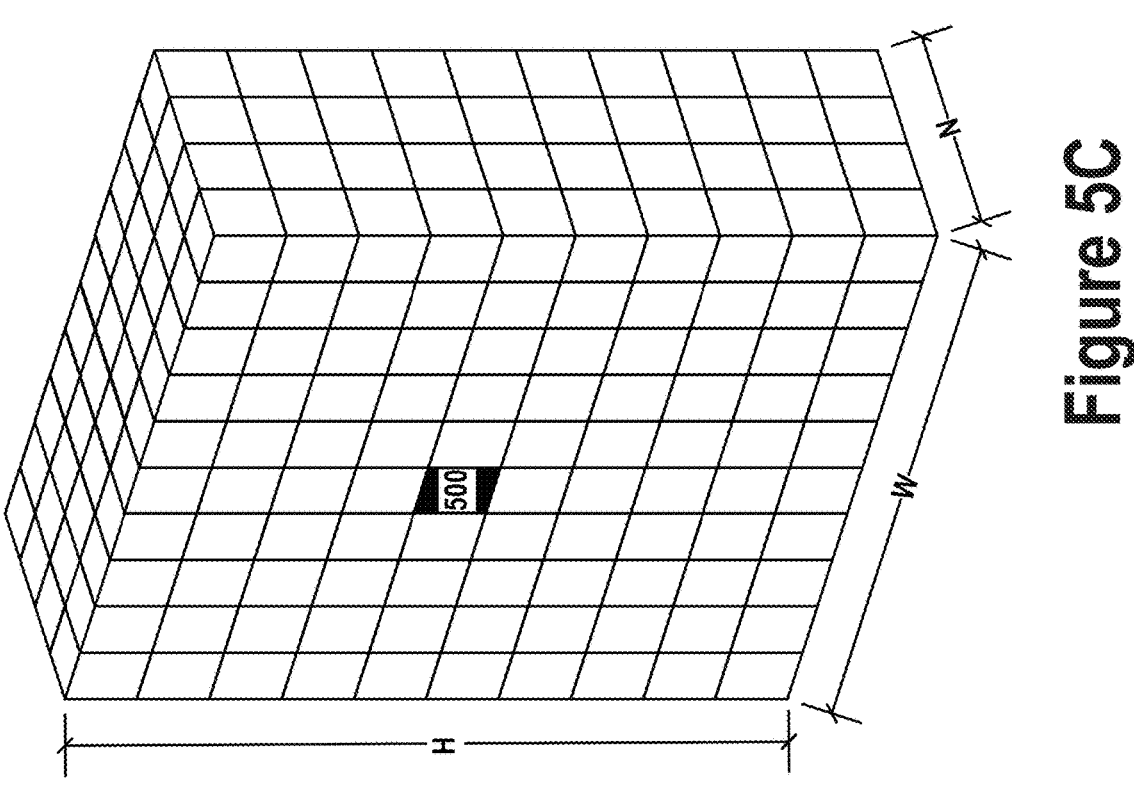

FIGS. 5A, 5B, and 5C illustrate aspects of a computation of a correlation volume. Specifically, FIG. 5A illustrates an example of feature map 408, FIG. 5B illustrates aspects of a similarity calculation between feature map 408 and feature map 410, and FIG. 5C illustrates an example of correlation volume 414.

Turning to FIG. 5A, feature map 408 is shown graphically in 3D as having a height H, a width W, and a depth D. In the example shown in FIG. 5A, the height H is equal to 10 pixels, the width W is equal to 10 pixels, and the depth D is equal to 9 features, although various other dimensions and/or combinations thereof are possible. Each pixel of the H by W feature map 408 may be associated with a feature vector. The feature vector may have D values, with each of the D values representing an extent of a corresponding visual feature present in a corresponding region of sub-image 402.

The height H and the width W may be equal to a height and width, respectively, of sub-image 402 or alternatively, as described above, may differ from the height and width of sub-image 402. The visual feature(s) present in the corresponding region of sub-image 402 may therefore be represented in sub-image 402 by a corresponding pixel or a corresponding plurality of pixels of sub-image 402. That is, as described above, a resolution of feature map 408 may represent a fraction (e.g., 3/2, ¾, ½, etc.) of the resolution of sub-image 402 such that in some implementations pixels of feature map 408 do not have a one to one correspondence with pixels of sub-image 402. Pixel 500 of feature map 408 is indicated with a dark fill for reference. Feature map 410 may have a similar structure, although the values thereof may be different and/or differently distributed due to defocus disparities between sub-images 402 and 404.

Turning to FIG. 5B, a cross-section of each of feature map 408 and feature map 410 is shown as having the width W and the height H. Similarity calculator 412 may be configured to determine pixel-wise similarities between feature maps 408 and 410 by comparing each respective pixel of feature map 408 to a corresponding plurality of pixels of feature map 410 that, based on the possible range of defocus disparities between sub-images 402 and 404, could represent the same scene portion. In the example shown in FIG. 5B, each respective pixel of feature map 408 may be compared to N, where N=4, pixels of feature map 410.

Thus, for example, pixel 500 in feature map 408 may be compared to each of pixels 502, 504, 506, and 508 of feature map 410. Specifically, similarity calculator 412 may compare (i) the D features of pixel 500 to the D features of pixel 502, thereby determining a first similarity value, (ii) the D features of pixel 500 to the D features of pixel 504, thereby determining a second similarity value, (iii) the D features of pixel 500 to the D features of pixel 506, thereby determining a third similarity value, and (iv) the D features of pixel 500 to the D features of pixel 508, thereby determining a fourth similarity value. Commensurate pixel-wise similarity calculations may be carried out with respect to other pixels of feature map 408. For example, features of the pixel to the right of pixel 500 may be compared to respective features of each of pixels 504, 506, 508, and the pixel to the right of pixel 508. The relative magnitude of these similarity values may be indicative of the depth of a scene portion represented by pixel 500, and correlation volume 414 may thus provide information about the overall 3D structure of the object represented by dual-pixel image data 400, albeit without an explicit depth determination that could result in undesired determinations of incorrect depth.

In the example of FIG. 5B, pixel 500 corresponds spatially with (i.e., has the same pixel coordinates as) pixel 502, and the similarity comparison is performed based on horizontally neighboring pixels 504, 506, and 508. Such a comparison may be performed where pixels of the dual-pixel image sensor are divided and/or arranged into left photosites and right photosites (e.g., as shown in FIG. 3), and pixel disparity is observed along horizontal lines of pixels. In cases where the pixels of the dual-pixel image sensor are instead divided and/or arranged into top photosites and bottom photosites (e.g., when dual-pixel image sensor 300 is rotated by 90 degrees), and pixel disparity is thus observed along vertical lines of pixels, the similarity comparison may instead be performed based on vertically neighboring pixels (e.g., feature maps 408 and 410 may also be rotated by 90 degrees). In the case of quad-pixel image data, the pixel-wise similarity between feature maps of two sub-images may be determined according to a spatial relationship among the photosites used to generate the two-sub images. Thus, in the context of quad-pixel image data, the pixel-wise similarity may involve a comparison of horizontally adjacent pixels, vertically adjacent pixels, and/or diagonally adjacent pixels. Thus, the subset of pixels of feature maps 408 and 410 involved in the similarity calculation used to generate correlation volume 414 may be based on a direction and magnitude of the defocus-disparity of sub-images generated by the dual pixel image sensor.

Turning to FIG. 5C, correlation volume 414 is shown as having a height H, a width W, and a depth N. That is, the depth of correlation volume 414 is equal to the number of similarity values calculated for each pixel of feature map 408, which may be based on a maximum defocus-disparity of the dual-pixel camera that generated dual-pixel image data 400. For a given pixel along the H×W area of correlation volume 414, the N similarity values associated with the given pixel may provide information about the disparity between the corresponding pixel of feature map 410 and corresponding pixels of feature map 410 that could represents the same scene portion as the corresponding pixel, thus providing depth information about the scene portion. Accordingly, by considering correlation volume 414 as a whole, anti-spoofing model 416 may be able to determine the depth variation across the area of dual-pixel image data 400, and thus determine whether the object represented thereby is a 3D object of a spoof thereof.

However, since correlation volume 414 expresses the feature similarities of different pixel pairs, it provides depth information indirectly. Accordingly, anti-spoofing system 430 can beneficially reduce the chances of generating incorrect depth values (which might imply a 3D structure where one is not present) based on 2D representations of 3D objects. Further, since anti-spoofing model 416 does not receive dual-pixel image data 400, sub-image 402, sub-image 404, feature map 408, and/or feature map 410 as direct inputs, anti-spoofing model 416 can reduce the chances of concluding that a 3D object is present when, for example, only a 2D representation thereof is present.

VI. EXAMPLE TRAINING SYSTEM

Figure 6:
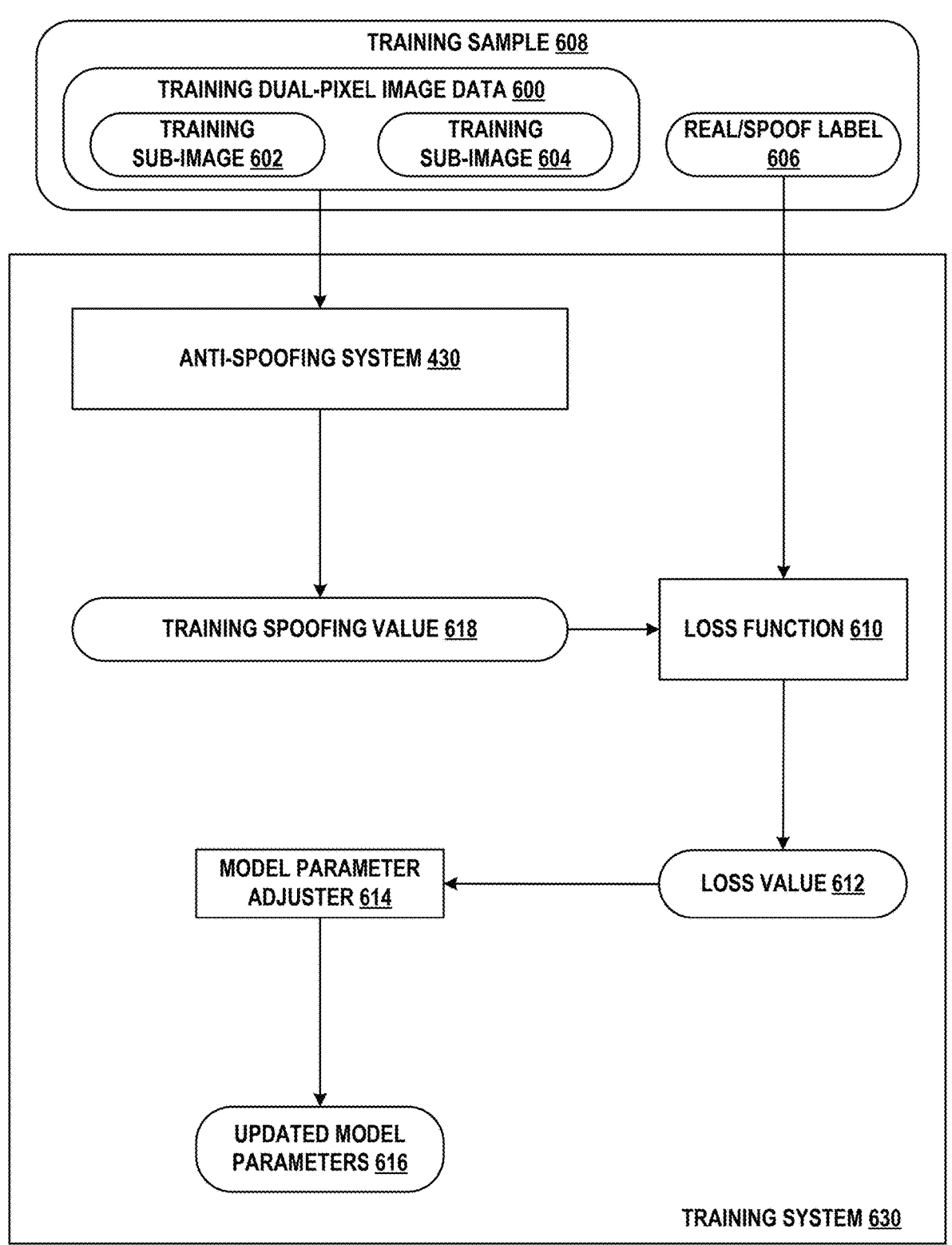
FIG. 6 illustrates a training system, in accordance with examples described herein.

FIG. 6 illustrates an example training system 630 that may be used to train components of anti-spoofing system 430.

Specifically, training system 630 may include anti-spoofing system 430, loss function 610, and model parameter adjuster 614. Training system 630 may be configured to determine updated model parameters 616 based on training sample 608. Training sample 608 may include training dual-pixel image data 600 and (ground-truth) real/spoof label 606, which indicates whether training dual-pixel image data 600 represents a real 3D object (e.g., a face) or an attempt to spoof the 3D object using, for example, a 2D representation thereof (e.g., an image of a face). Training dual-pixel image data 600 may include training sub-image 602 and training sub-image 604. Thus, training dual-pixel image data 600 may be analogous to dual-pixel image data 400, but may be processed at training time rather than at inference time.

Anti-spoofing system 430 may be configured to generate, based on training dual-pixel image data 600, training spoofing value 618, which may be analogous to spoofing value 418. Specifically, encoder-decoder model 406 may be configured to generate a first training feature map based on training sub-image 602 and a second training feature map based on training sub-image 604. Similarity calculator 412 may be configured to generate a training correlation volume based on the first training feature map and the second training feature map. Anti-spoofing model 416 may be configured to generate training spoofing value 618 based on the training correlation volume.

An accuracy with which anti-spoofing system 430 generates training spoofing value 618 based on training dual-pixel image 600 may be quantified using loss function 610. Loss function 610 may be configured to generate loss value 612 based on training spoofing value 618 and real/spoof label 606. For example, real/spoof label 606 may be equal to 0 when training dual-pixel image data 600 represents a real 3D object, and may be equal to 1 when training dual-pixel image data 600 represents an attempt to spoof the 3D object using a representation and/or imitation thereof. Training spoofing value 618 may range from 0 to 1, depending on how confident anti-spoofing system 430 is in its determination. Thus, loss function 610 may be configured to determine a difference between training spoofing value 618 and a numerical representation of real/spoof label 606. In some implementations, loss function 610 may include a weighted sum of a plurality of different loss terms. Additionally or alternatively, anti-spoofing system 430 may be configured to generate a training real/spoof determination based on the training spoofing value 618 and threshold value 420, and the training real/spoof determination may be compared to real/spoof label 606 by loss function 610.

Model parameter adjuster 614 may be configured to determine updated model parameters 616 based on loss value 612. Updated model parameters 616 may include one or more updated parameters of any trainable component of anti-spoofing system 430, including, for example, encoder-decoder model 406 and/or anti-spoofing model 416. In some cases, a subset of anti-spoofing system 430 may be pre-trained based on another training data set prior to training by training system 630.

Model parameter adjuster 614 may be configured to determine updated model parameters 616 by, for example, determining a gradient of loss function 610. Based on this gradient and loss value 612, model parameter adjuster 614 may be configured to select updated model parameters 616 that are expected to reduce loss value 612, and thus improve performance of anti-spoofing system 430. After applying updated model parameters 616 to anti-spoofing system 430, the operations discussed above may be repeated to compute another instance of loss value 612 and, based thereon, another instance of updated model parameters 616 may be determined and applied to anti-spoofing system 430 to further improve the performance thereof. Such training of anti-spoofing system 430 may be repeated until, for example, loss value 612 is reduced to below a target threshold loss value.

VII. ADDITIONAL EXAMPLE OPERATIONS

FIG. 7 illustrates a flow chart of operations related to determining whether dual-pixel image data represents an attempt at spoofing a 3D object, such as a face. The operations may be carried out by computing device 100, computing system 200, anti-spoofing system 430, and/or training system 630, among other possibilities. The embodiments of FIG. 7 may be simplified by the removal of any one or more of the features shown therein. Further, these embodiments may be combined with features, aspects, and/or implementations of any of the previous figures or otherwise described herein.

Block 700 may involve obtaining dual-pixel image data that represents an object and includes a first sub-image and a second sub-image.

Block 702 may involve generating (i) a first feature map based on the first sub-image and (ii) a second feature map based on the second sub-image.

Block 704 may involve generating a correlation volume by determining, for each respective offset of a plurality of offsets between the first feature map and the second feature map, pixel-wise similarities between (i) the first feature map and (ii) the second feature map offset from the first feature map by the respective offset.

Block 706 may involve determining, by an anti-spoofing model and based on the correlation volume, a spoofing value indicative of a likelihood that the object represented by the dual-pixel image data is being spoofed.

In some embodiments, the spoofing value may be compared to a threshold value. Based on comparing the spoofing value to the threshold value, it may be determined whether the object is being spoofed.

In some embodiments, based on determining whether the object is being spoofed, it may be determined whether to (i) unlock a computing device or (ii) maintain the computing device in a locked state.

In some embodiments, each of the first feature map and the second feature map may have a width W, a height H, and a depth D. The plurality of offsets may include N offsets along a direction of at least one of the width W or the height H. For each respective offset of the N offsets, each respective pixel-wise similarity of the pixel-wise similarities may be based on a comparison of (i) first D features of a first pixel in the first feature map and (ii) second D features of a corresponding second pixel in the second feature map. The correlation volume may have the width W, the height H, and a depth N.

In some embodiments, generating the first feature map and the second feature map may include generating, by an encoder model, (i) a first latent vector representation of the first sub-image and (ii) a second latent vector representation of the second sub-image, and generating, by a decoder model, (i) the first feature map based on the first latent vector representation and (ii) the second feature map based on the second latent vector representation.

In some embodiments, the dual-pixel image data may have been generated by a dual-pixel image sensor that includes a plurality of pixels each of which is divided into two or more photosites. When the two or more photosites include a right photosite and a left photosite, the plurality of offsets between the first feature map and the second feature map may include offsets along a horizontal direction. When the two or more photosites include a top photosite and a bottom photosite, the plurality of offsets between the first feature map and the second feature map may include offsets along a vertical direction.

In some embodiments, the plurality of offsets between the first feature map and the second feature map may be based on a maximum possible defocus-disparity between pixels of the first sub-image and pixels of the second sub-image.

In some embodiments, determining the pixel-wise similarities may include determining a cosine similarity between (i) pixels of the first feature map and (ii) corresponding pixels of the second feature map offset from the first feature map by the respective offset.

In some embodiments, determining the pixel-wise similarities may include determining an inner product between (i) pixels of the first feature map and (ii) corresponding pixels of the second feature map offset from the first feature map by the respective offset.

In some embodiments, the anti-spoofing model may include a correlation encoder model and a binary classifier model. Generating the spoofing value may include generating, by the correlation encoder model and based on the correlation volume, a latent representation of the correlation volume, and generating, by the binary classifier model and based on the latent representation of the correlation volume, the spoofing value.

In some embodiments, the spoofing value may be generated by the anti-spoofing model based on similarities between adjacent pixels as represented by the correlation volume and independently of receiving, as a direct input, (i) the first sub-image and the second sub-image and (ii) a depth image generated based on the first sub-image and the second sub-image.

In some embodiments, the first feature map and the second feature map may be generated prior to demosaicing of the dual-pixel image data.

In some embodiments, the first feature map and the second feature map may be generated by a machine learning model. At least one of the machine learning model or the anti-spoofing model may have been trained by a training process that includes obtaining a training sample that includes (i) training dual-pixel image data that represents a training object and includes a first training sub-image and a second training sub-image and (ii) an indication of whether the training dual-pixel image data represents an attempt to spoof the training object. The training process may also include generating, by the machine learning model, (i) a first training feature map based on the first training sub-image and (ii) a second training feature map based on the second training sub-image. The training process may additionally include generating a training correlation volume by determining, for each respective offset of the plurality of offsets between the first training feature map and the second training feature map, pixel-wise training similarities between (i) the first training feature map and (ii) the second training feature map offset from the first training feature map by the respective offset. The training process may further include determining, by the anti-spoofing model and based on the training correlation volume, a training spoofing value indicative of a likelihood that the training object represented by the training dual-pixel image data is being spoofed. The training process may yet further include determining a loss value based on the training spoofing value and the indication of whether the training dual-pixel image data represents the attempt to spoof the training object, and adjusting, based on the loss value, one or more parameters of one or more of the machine learning model or the anti-spoofing model.

In some embodiments, the object may include a face and/or another body part/location.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

obtaining dual-pixel image data that represents an object and comprises a first sub-image and a second sub-image;

generating (i) a first feature map based on the first sub-image and (ii) a second feature map based on the second sub-image;

generating a correlation volume by determining, for each respective first pixel of a plurality of pixels of the first feature map, a plurality of similarity values representing pixel-wise similarities between (i) first features of the respective first pixel of the first feature map and (ii) second features of each respective second pixel of a corresponding plurality of pixels of the second feature map, wherein each respective second pixel of the corresponding plurality of pixels of the second feature map is offset from the respective first pixel of the first feature map by a corresponding offset of a plurality of offsets, and wherein a depth of the correlation volume corresponds to a number of the plurality of offsets; and determining, by an anti-spoofing model and based on the correlation volume, a spoofing value indicative of a likelihood that the object represented by the dual-pixel image data is being spoofed.

2. The computer-implemented method of claim 1, further comprising:

comparing the spoofing value to a threshold value; and based on comparing the spoofing value to the threshold value, determining whether the object is being spoofed.

3. The computer-implemented method of claim 2, further comprising:

based on determining whether the object is being spoofed, determining whether to (i) unlock a computing device or (ii) maintain the computing device in a locked state.

4. The computer-implemented method of claim 1, wherein:

each of the first feature map and the second feature map has a width W, a height H, and a depth D, the plurality of offsets comprises N offsets along a direction of at least one of the width W or the height H, for each respective offset of the N offsets, each respective similarity value of the plurality of similarity values of each respective first pixel is based on a comparison of (i) first D features of the respective first pixel in the first feature map and (ii) second D features of the respective second pixel in the second feature map, and the correlation volume has the width W, the height H, and the depth equal to N.

5. The computer-implemented method of claim 1, wherein generating the first feature map and the second feature map comprises:

generating, by an encoder model, (i) a first latent vector representation of the first sub-image and (ii) a second latent vector representation of the second sub-image; and generating, by a decoder model, (i) the first feature map based on the first latent vector representation and (ii) the second feature map based on the second latent vector representation.

6. The computer-implemented method of claim 1, wherein the dual-pixel image data has been generated by a dual-pixel image sensor comprising a plurality of pixels each of which is divided into two or more photosites, wherein, when the two or more photosites include a right photosite and a left photosite, the plurality of offsets includes offsets along a horizontal direction, and wherein, when the two or more photosites include a top photosite and a bottom photosite, the plurality of offsets includes offsets along a vertical direction.

7. The computer-implemented method of claim 1, wherein the plurality of offsets is based on a maximum possible defocus-disparity between pixels of the first sub-image and pixels of the second sub-image.

8. The computer-implemented method of claim 1, wherein determining the plurality of similarity values comprises:

determining, for each respective second pixel of a corresponding plurality of pixels of the second feature map, a cosine similarity between (i) the first features of the respective first pixel of the first feature map and (ii) the second features of the respective second pixel.

9. The computer-implemented method of claim 1, wherein determining the plurality of similarity values comprises:

determining, for each respective second pixel of a corresponding plurality of pixels of the second feature map, an inner product between (i) the first features of the respective first pixel of the first feature map and (ii) the second features of the respective second pixel.

10. The computer-implemented method of claim 1, wherein the anti-spoofing model comprises a correlation encoder model and a binary classifier model, and wherein generating the spoofing value comprises:

generating, by the correlation encoder model and based on the correlation volume, a latent representation of the correlation volume; and generating, by the binary classifier model and based on the latent representation of the correlation volume, the spoofing value.

11. The computer-implemented method of claim 1, wherein the spoofing value is generated by the anti-spoofing model based on similarities between adjacent pixels as represented by the correlation volume and without receiving as a direct input any one of (i) the first sub-image, (ii), the second sub-image, and (iii) a depth image generated based on the first sub-image and the second sub-image.

12. The computer-implemented method of claim 1, wherein the first feature map and the second feature map are generated prior to demosaicing of the dual-pixel image data.

13. The computer-implemented method of claim 1, wherein the first feature map and the second feature map are generated by a machine learning model, and wherein at least one of the machine learning model or the anti-spoofing model have been trained by a training process comprising:

obtaining a training sample comprising (i) training dual-pixel image data that represents a training object and comprises a first training sub-image and a second training sub-image and (ii) an indication of whether the training dual-pixel image data represents an attempt to spoof the training object;

generating, by the machine learning model, (i) a first training feature map based on the first training sub-image and (ii) a second training feature map based on the second training sub-image;

generating a training correlation volume by determining, for each respective first training pixel of a plurality of pixels of the first training feature map, a plurality of training similarity values representing pixel-wise training similarities between (i) first training features of the respective first training pixel of the first training feature map and (ii) second training features of each respective second training pixel of a corresponding plurality of training pixels of the second training feature map, wherein each respective second training pixel of the corresponding plurality of training pixels of the second feature map offset from the respective first training pixel of the first training feature map by a corresponding training offset of the plurality of offsets;

determining, by the anti-spoofing model and based on the training correlation volume, a training spoofing value indicative of a likelihood that the training object represented by the training dual-pixel image data is being spoofed;

determining a loss value based on the training spoofing value and the indication of whether the training dual-pixel image data represents the attempt to spoof the training object; and adjusting, based on the loss value, one or more parameters of one or more of the machine learning model or the anti-spoofing model.

14. The computer-implemented method of claim 1, wherein the object comprises a face.

15. A system comprising:

a processor; and a non-transitory computer-readable medium having stored thereon instructions that, when executed by the processor, cause the processor to perform operations comprising:

obtaining dual-pixel image data that represents an object and comprises a first sub-image and a second sub-image;

generating (i) a first feature map based on the first sub-image and (ii) a second feature map based on the second sub-image;

generating a correlation volume by determining, for each respective first pixel of a plurality of pixels of the first feature map, a plurality of similarity values representing pixel-wise similarities between (i) first features of the respective first pixel of the first feature map and (ii) second features of each respective second pixel of a corresponding plurality of pixels of the second feature map, wherein each respective second pixel of the corresponding plurality of pixels of the second feature map is offset from the respective first pixel of the first feature map by a corresponding offset of a plurality of offsets, and wherein a depth of the correlation volume corresponds to a number of the plurality of offsets; and determining, by an anti-spoofing model and based on the correlation volume, a spoofing value indicative of a likelihood that the object represented by the dual-pixel image data is being spoofed.

16. A non-transitory computer-readable medium having stored thereon instructions that, when executed by a computing device, cause the computing device to perform operations comprising:

obtaining dual-pixel image data that represents an object and comprises a first sub-image and a second sub-image;

generating (i) a first feature map based on the first sub-image and (ii) a second feature map based on the second sub-image;

generating a correlation volume by determining, for each respective first pixel of a plurality of pixels of the first feature map, a plurality of similarity values representing pixel-wise similarities between (i) first features of the respective first pixel of the first feature map and (ii) second features of each respective second pixel of a corresponding plurality of pixels of the second feature map, wherein each respective second pixel of the corresponding plurality of pixels of the second feature map is offset from the respective first pixel of the first feature map by a corresponding offset of a plurality of offsets, and wherein a depth of the correlation volume corresponds to a number of the plurality of offsets; and determining, by an anti-spoofing model and based on the correlation volume, a spoofing value indicative of a likelihood that the object represented by the dual-pixel image data is being spoofed.

17. The system of claim 15, wherein:

each of the first feature map and the second feature map has a width W, a height H, and a depth D, the plurality of offsets comprises N offsets along a direction of at least one of the width W or the height H, for each respective offset of the N offsets, each respective similarity value of the plurality of similarity values of each respective first pixel is based on a comparison of (i) first D features of the respective first pixel in the first feature map and (ii) second D features of the respective second pixel in the second feature map, and the correlation volume has the width W, the height H, and the depth equal to N.

18. The system of claim 15, wherein the plurality of offsets is based on a maximum possible defocus-disparity between pixels of the first sub-image and pixels of the second sub-image.

19. The computer-implemented method of claim 1, wherein the plurality of offsets comprises (i) a zero-offset corresponding to alignment of the first feature map and the second feature map and (ii) a plurality of non-zero offsets corresponding to a plurality of misalignments between the first feature map and the second feature map.

20. The computer-implemented method of claim 1, wherein the plurality of similarity values comprises a plurality of scalar similarity values.

* * * * *